(12) United States Patent
Metaxas et al.

(10) Patent No.: US 8,743,707 B2
(45) Date of Patent: Jun. 3, 2014

(54) REAL TIME MEASUREMENT OF NETWORK DELAY

(75) Inventors: Mike Metaxas, Oakland Gardens, NY (US); Vijay Jayapalan, Irving, TX (US); Sundar Padmanabhan, Irving, TX (US); Manvinder Chopra, Carrollton, TX (US); Jim Bartlett, Santa Barbara, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1752 days.

(21) Appl. No.: 11/863,927

(22) Filed: Sep. 28, 2007

(65) Prior Publication Data

US 2009/0086716 A1 Apr. 2, 2009

(51) Int. Cl.
*H04L 12/26* (2006.01)
*H04L 12/66* (2006.01)
*H04M 1/24* (2006.01)

(52) U.S. Cl.
USPC ......... 370/248; 370/253; 370/356; 379/27.01

(58) Field of Classification Search
None
See application file for complete search history.

(56) References Cited

U.S. PATENT DOCUMENTS

| 5,596,623 | A * | 1/1997 | Uchiba et al. | 379/29.01 |
| 2001/0018287 | A1 * | 8/2001 | Reichle | 439/374 |
| 2002/0085683 | A1 * | 7/2002 | Masri et al. | 379/27.01 |

* cited by examiner

*Primary Examiner* — Melanie Jagannathan (57) ABSTRACT

Delay is measured associated with the transfer of voice signals involving a telephone connected to a PSTN carrier (e.g., non VoIP based) where the call is terminated by an operator agent using a workstation connected to a VoIP based network. A test tone is provided to the telephone causing a tone to be generated at a headset of the workstation. An oscilloscope measures the delay using an input of a first signal associated with the generation of the test tone at the telephone, and a second signal associated with the generation of the resulting tone at the headset. The tone at the headset can be looped back into the headset microphone, causing a return signal to be generated and measured. Once the overall delay is known, and the delay of certain elements are estimated, the delay associated with other network elements, including the workstation, can be determined.

20 Claims, 5 Drawing Sheets

REAL TIME MEASUREMENT OF NETWORK DELAY

BACKGROUND

The disclosure generally pertains to measuring delay of information transfer in a communications network. In one embodiment, the communications network comprises a circuit switched based technology portion and a packetized (Voice over IP) based technology portion.

In various telecommunications applications, such as calls involving operator services, it is desirable to measure the end to end delay associated with transferring voice signals of the call. Excessive delay can lead to customer frustration and to a perception of poor customer service by the caller. For calls involving both traditional circuit switched technology (referred to herein as "PSTN") and Voice over IP ("VoIP") technologies, measuring such delay can be difficult and/or involving costly specialized equipment. Thus, there is a need for a simplified and easy to use system and method for measuring delay for voice-based calls involving VoIP and traditional circuit switched technologies.

BRIEF DESCRIPTION OF THE SEVERAL VIEWS OF THE DRAWING(S)

Reference will now be made to the accompanying drawings, which are not necessarily drawn to scale, and which illustrate various embodiments of the invention, wherein.

DETAILED DESCRIPTION OF THE PREFERRED EMBODIMENT

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

In telecommunications environments, it is desirable to be able to measure the delay of transferring information from an input point where the information is provided, to a destination point where it is played out. For traditional circuit switched networks, various mechanisms have been created and are known for measuring delay, including speech delay. In speech networks, voice delay is an important parameter for various reasons. One such reason is that studies have shown that people will tolerate a certain maximum threshold in speech delay, otherwise the delay becomes distracting and irritating. While many data applications can tolerate some delay, human interaction involving speech is fairly sensitive to delays over 250-350 milliseconds, and 500 or more milliseconds is very noticeable. Further, in some applications, such as when a caller desires to interact with a carrier's operator, excessive delay can reduce the operator's efficiency and lead to a poorer perception of customer services.

Thus, it is desirable to know the delay for information transfer, particularly speech, in a communications network. Knowing the delay allows personnel to engineer the network to provide optimum service to callers. In order to do so, it is necessary to first quantify the delay, by measuring its value.

For communication networks involving voice over IP ("VoIP"), the traditional methods of voice measurement are not always readily available or applicable. VoIP involves the packetization of digitized voice samples, and certain requirements are imposed on equipment in processing the packets, based on the function performed. For equipment that receives an analog voice signal, the analog signals must be converted to digitized speech, according to a defined procedure. Typically, speech is converted from analog to digital form using one of various well known standards, such as μ-law encoding. Additional processes or equipment will then process the digital speech samples to packetize them into a structured protocol frame or data unit. Such well known structures include ATM or IP, although other forms are possible. These packets may then be streamed out, using for example, the Real Time Protocol ("RTP") standard for speech.

Typically, this process involves receiving the speech data in a buffer, collecting the data until a packet can be formed, and then transmitting the packet out on an output port. Each of these steps requires a definite amount of time, although typically this is measured in the range of milli-seconds (1/1000 of a second). The time that is required to receive the minimum number of speech bits on an input port and the time that is required to transmit them on an output port are a function of the transmission speeds for the input and output port respectively. The time that is required to packetize the speech is dependent on various factors, including the processor speed, load, buffer sizes, and the algorithms used. These can vary from vendor to vendor. Other aspects of delay are involved, which contribute to the overall delay from when a voice signal is received to when it is played out.

When ascertaining the overall delay, it is often the case that the delay of signal transfer between two points (whether it be in analog, digital (non-packetized) or packetized form) is well known in some cases or for some equipment, and not known for other cases or other equipment. However, if the overall delay is known, and certain sources of delay can be readily estimated or are otherwise measured, it is readily possible to ascertain the delay due to the other elements. In this manner, it is possible to break down the problem of ascertaining the delay into smaller subsets, allowing the contributing delay to be determined for various types of equipment. Once the delay in known for each contributing processes or equipment, then appropriate engineering can be performed. Such activities may involve creating a larger memory space, redefining certain processing priorities, or otherwise altering resource allocations in order to minimize delay where required.

Figure 1:
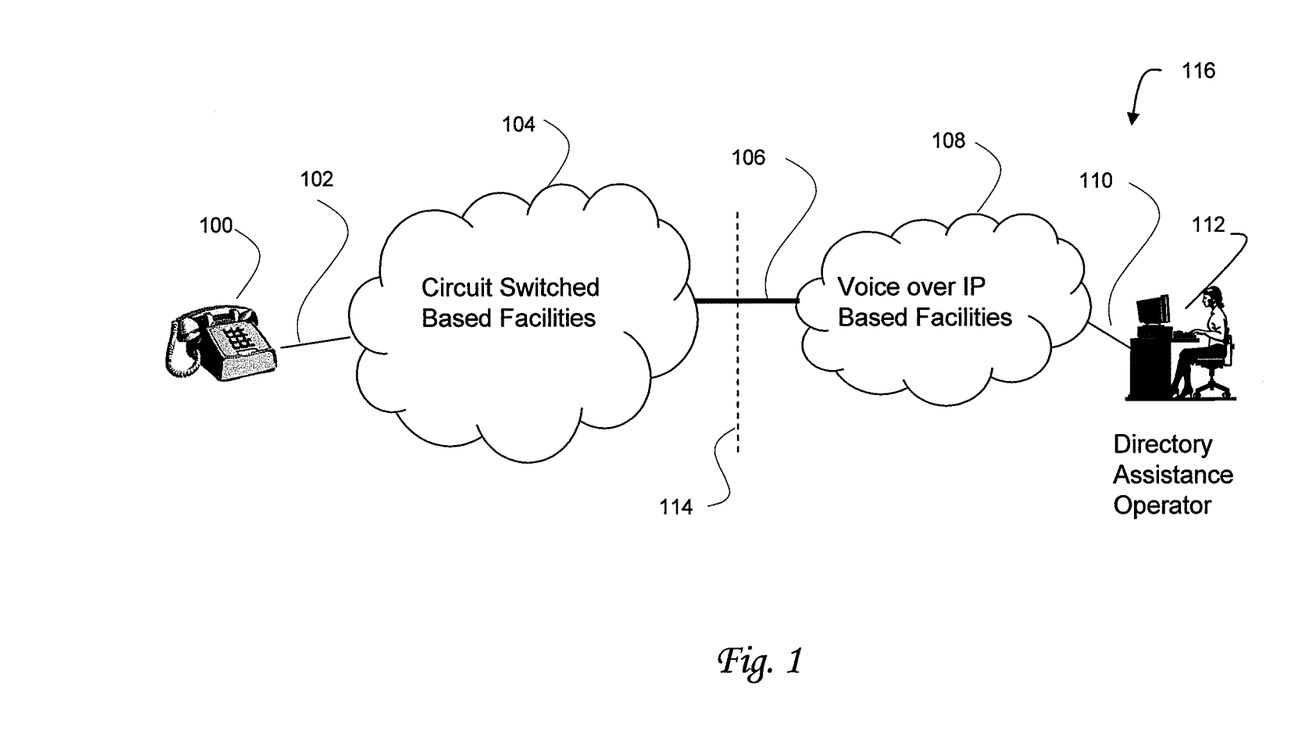
FIG. 1 illustrates one embodiment of the context of measuring speech delay in a circuit switched and voice over IP ("VoIP") environment for a telecommunications service.

One environment in which it is desirable to measure delay is shown in FIG. 1. In FIG. 1, a communications environment is shown for providing various operator services. Operator services typically involve various specialized telephone company services that are provided to callers, and which traditionally have involved an operator, but which in many cases may be automated. For example, reverse charging, third party billing, and directory assistance can be considered in this category of services. Although the present invention will be discussed in the context of directory assistance ("DA"), it can be used for other services, whether operator services or other applications.

In the embodiment of providing DA service, a caller is attempting to receive information regarding the telephone number of a person. Typically, an automated system prompts the caller to enter a city and state, as well as the party's name, which provides a context for accessing a database (since many DA service providers furnish this information on a national basis). Some embodiments may utilize speech recognition for ascertaining the context. Others may record the caller's response and audibly present the information to an operator to efficiency purpose or if the automated speech recognition procedure is not successful. The operator will then manually assist is providing the information to the caller. The exact details of the operation of the DA service do not impact the invention.

Turning to FIG. 1, a typically scenario involves a caller located at a telephone 100, and connected via facilities 102 to a carrier 104. The caller has placed a call to directory assistance using a defined telephone number associated with the service. Although FIG. 1 depicts a wireline-based caller, e.g., the facilities 102 are wireline, other embodiments may provide the service to wireless callers. Further, a variety of service providers 104 may contract to receive various operator services from an operator services provider 116. The operator services provider in this example comprises the VoIP network 108 and the operation station 112. Other operator services providers may have other architectures.

The carrier 104 is shown in this embodiment as a circuit switched based provider, but other type of technologies may be used. This is shown because traditional circuit switched facilities still predominate, and often serve the callers who are calling for the operator service. Other embodiments may of the carrier 104 may also involve the use of VoIP facilities.

In this embodiment, the operator service provider 116 is partially or wholly utilizing VoIP technology. This is illustrated as involving a VoIP network 108, although it can be a mix of traditional circuit switch (digital or analog, or both) and VoIP technologies. In this embodiment, for sake of illustration, a homogenous VoIP environment 108 is shown. As a certain point 114, the speech being transferred is converted into a packetized manner versus a non-packetized manner. In FIG. 1, the non-packetizing manner is associated with network 104 and the packetized manner is associated with network 108. The equipment performing this function is not shown in FIG. 1.

An operator station 112 is shown that is connected to the VoIP facilities 108, typically using a LAN or other means of connection 110. The workstation typically is based on a personal computer, or other form of processor based workstation. It is presumed that the workstation has an IP interface and is capable of processing VoIP. Although not shown, the workstation may include means for providing audible signals to the operator. This is typically done using a headset or other speaker arrangement, including 'ear-pieces', ear-buds, headphones, headset, or other variations. The workstation also includes means for receiving speech from an operator, usually in the form of a microphone of some sort, which produces a signal which is then digitized and packetized. Quite often, the microphone and speaker are integrated into a headset, which is connected via a cord to the workstation.

In the embodiment shown in FIG. 1, it is desirable to be able to measure the speech delay from the telephone 100 to the operator workstation 112, and the return path delay (back from the operator workstation to the telephone). If the delay is too long, the caller and the operator may be distracted or annoyed, and potentially poor customer service may be provided to the caller. Further, because the operator's work performance is measured in one aspect based on the time spent with a caller, unnecessary or undesirable delay distorts a true measurement of the productivity of the operator. Thus, there is a need to measure the delay in conveying speech from the caller to the operator, and further ascertain which components are contributing which portions of the delay in the combined communications network. Further, because measurements are typically done on a sporadic or on a "as needed" basis, it is desirable that the cost of equipment used to measure the delay be inexpensive, such as involving readily available test equipment and relatively simple and quick to set up and obtain the measurements. Avoidance of expensive, specialized text equipment is desirable, as is complicated procedures.

Figure 2:
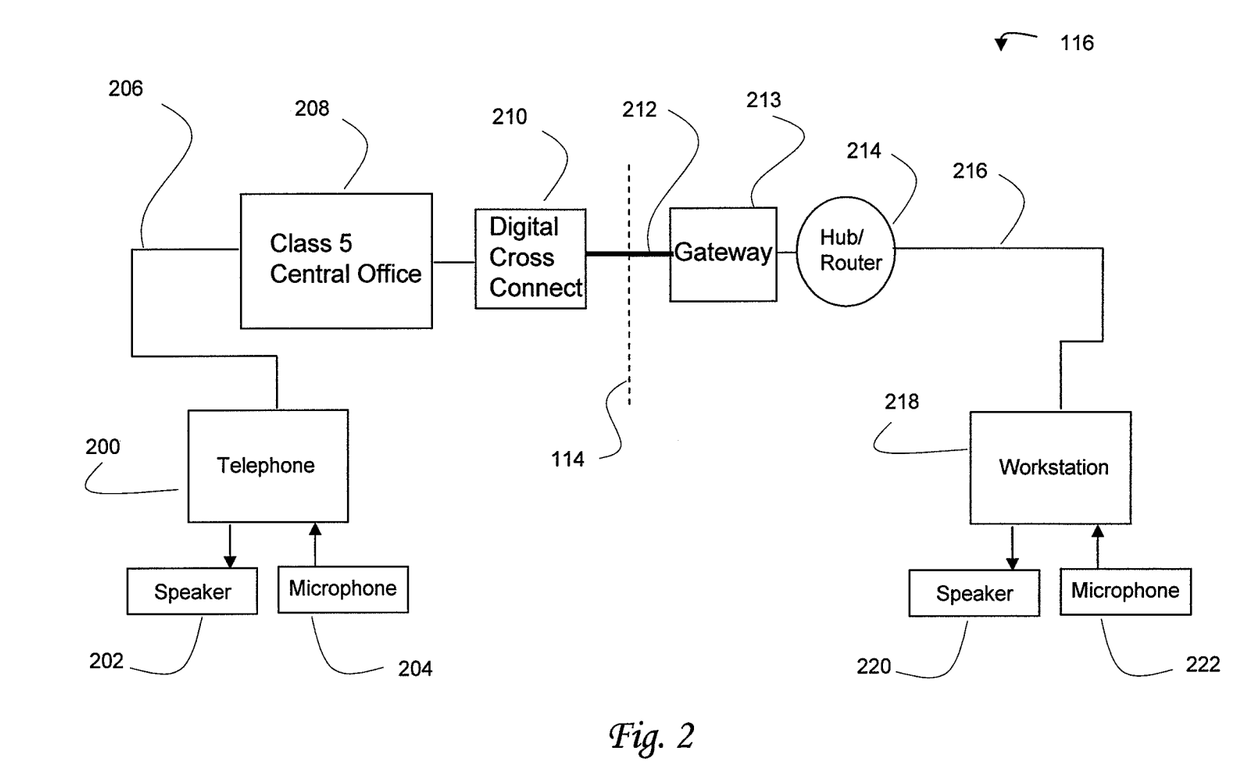
FIG. 2 illustrates a logical depiction of an embodiment for measuring speech delay in a circuit switched and VoIP environment for a telecommunications service.

FIG. 2 illustrates a logical depiction of the pertinent components that may be present in FIG. 1. In FIG. 2, the caller's telephone 200 is shown with its functional speaker 202 and microphone 204 as separate elements. The speaker is also known as an 'ear-piece' of a traditional telephone and the microphone is also known as the 'mouthpiece'. In the case of a traditional telephone 200, connected via wireline 206 facilities, the signal to/from the phone is analog and converted to digital signals at some point before, or at, the telephone switch 208. The telephone switch 208 is a 'central office' or 'class 5 central office' for handling locally originated calls. Typically, the central office processes voice signals in a digitized format, although not packetized in a VoIP form. It is not uncommon for more than one central office 208 to be involved in handling an operator services call, but because the delay for voice signals in central offices is fairly well known, it is sufficient to illustrate the principles of the present invention using this embodiment of a single central office. Further, as it will be seen, the delay for circuit switched transmission of voice signals is fairly minimal. The central office 208 upon detecting a request for an operator services call, will then transmit the call to a digital cross connect 210, or a similar device which serves to connect the call from the central office to the operator services provider 114. The digital cross connect switch is a non-real time switch, which provides a plurality of trunks to the operator services provider. Various arrangements for conveying the operator services call to the operator service provider 114 are possible, including various signaling protocols.

When the call passes over the demarcation point 114 and enters the facilities 212 of the operator services provider ("OSP") 116, the OSP typically will convert the digital voice signals to VoIP using a gateway 213. The gateway 213 performs the aforementioned functions of buffering the digitized voice, packetizing and transmitting the packet over an IP connection. These are then received by a hub/router 214 which transmits the VoIP packets over a facility 216 to the workstation 218. Although not shown, a variety of other LAN and VoIP technologies may be embodied. Once the VoIP packets are received at the workstation 218, a reverse process occurs in that the voice packets are buffered, the digital voice signals extracted, and converted to audio using a speaker 220 at the workstation. The process of the workstation receiving the VoIP and generating audio also has a fixed delay associated with it.

A reverse process is when the operator speaks to the caller. As noted, the speaker and microphone are typically integrated in a headset which is connected to the workstation. In this case, voice signals are received by the microphone 222, converted by the workstation to VoIP, transmitted over the facilities 216, routed by the hub/route 214 to a gateway 213, which converts the VoIP to digitized stream voice signals.

Figure 3:
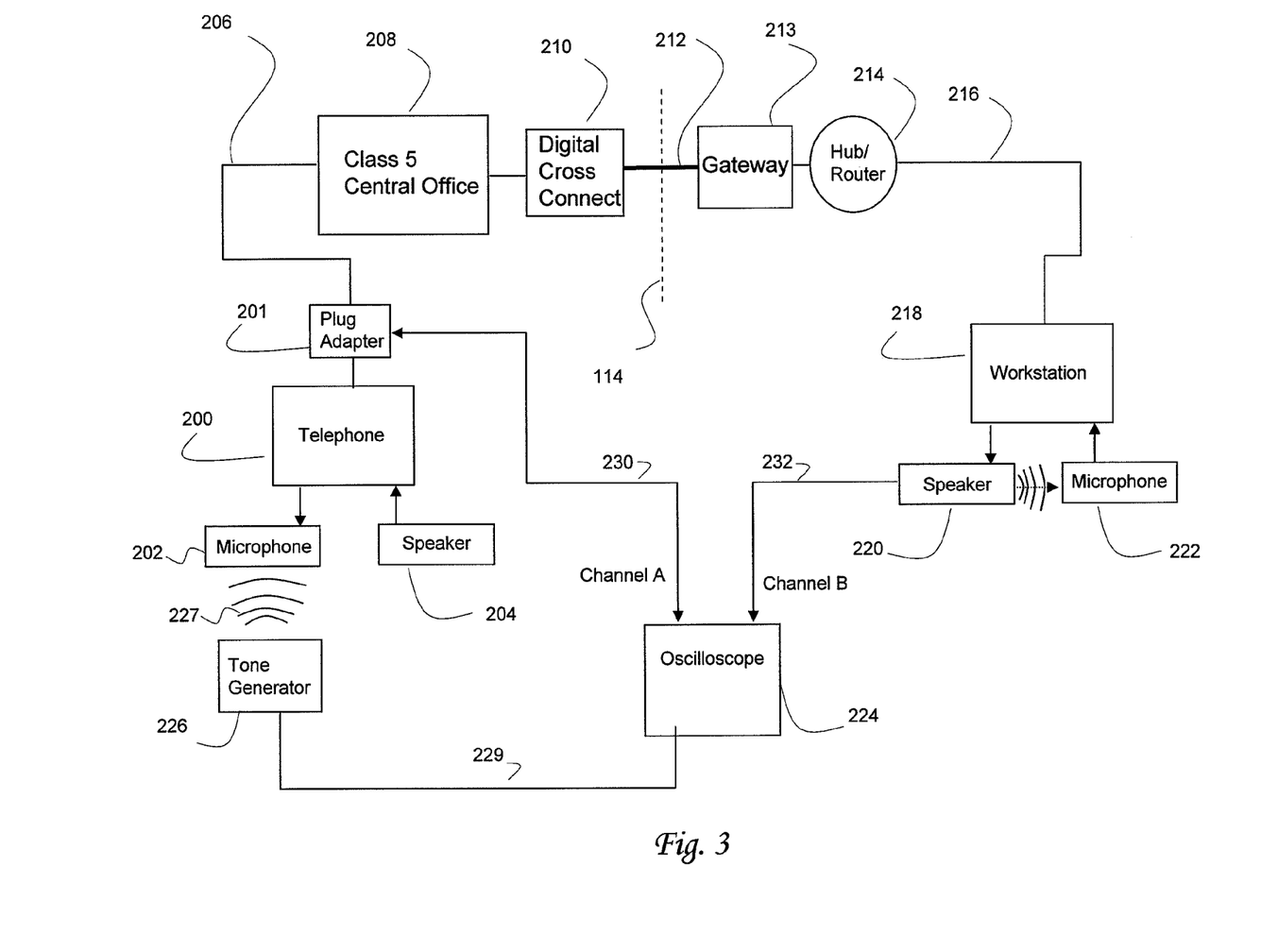
FIG. 3 illustrates one embodiment of measurements components in relation to the location depiction for measuring speech delay in a circuit switch and VoIP environment.

The set up for the measurement of the delay associated with the transfer of speech from the caller at the caller's microphone 204, through the switch telephone network 208, through the gateway 213, the hub, 214, and through the workstation is shown in FIG. 3. FIG. 3 illustrates one embodiment of the equipment and configuration for measuring the speech delay.

The measurement device shown in FIG. 3 is an oscilloscope 224, which is a well known and readily available electronics test measurement device. Although an oscilloscope is disclosed, a variety of other test devices could be used which measure the delay associated with a signal, and are intended to be within the scope of the principles of the present invention. Because an oscilloscope is readily available, accurate, and inexpensive, it is a preferred embodiment for practicing the present invention. The function of the oscilloscope is to visually present waveforms associated with electrical signals, and many modern oscilloscopes allow storage and playback of non-recurring signals.

The oscilloscope receives two inputs—channel A and channel B. Channel A receives a signal 230 that is connected to a plug adapter 201 associated with the caller's telephone 200. Channel B is receiving a signal 232 that is associated with the speaker 220 of workstation 218. In this embodiment, the telephone 200 is a regular telephone, typically located in the same room as the workstation 218 to facilitate testing. Thus, this embodiment measures the delay associated with a telephone as the call typically passes through one or two class 5 central offices, and reflects a typical call route for a directory assistance caller.

The basic operation of the test involves generating a defined duration tone using a tone generator 226. The tone generator, like the oscilloscope, is readily available and inexpensive. The tone generator produces a tone 227, typically 100 milliseconds (ms) in duration, in an audible frequency range into the microphone of a regular telephone set 200 (e.g., plain-old-telephone set). The telephone 200 in turn generates an analog signal, which is transmitted over the facilities 206 to the central office. This presumes that a telephone call has been first established from the telephone 200, through the central office 208 to the workstation. Once a call-path is established, the tone is generated.

The plug adaptor 201 allows the oscilloscope to 'tap' into the facility 206, and monitor the generation of the signal. Because the oscilloscope is synchronized with the tone generator via connection 229, the oscilloscope knows when the tone generator first started generating a tone. The synchronization can occur in different ways, which is not material to the operation of the embodiment. First, the tone generator could be manually operated to generate a tone, and send a signal over the connection 229, which triggers the oscilloscope. In other embodiments, the oscilloscope could generate a signal 229, instructing the tone generator to issue the tone. Either approach serves to synchronize the oscilloscope with the tone generator.

The oscilloscope then knows the delay of the start of the tone to the detection in the plug adapter, which should be very minimal relative to the overall delay. This step may be optional, as because the delay is minimal, the oscilloscope could trigger off of the start of the detection of the signal itself. However, synchronizing the oscilloscope minimizes any false triggering.

The signal is transmitted from the central office to the digital cross connect 210, on to the gateway 213, to the hub/router 214 and then to the workstation 218. In practice, the delay associated with the time the tone generator generates the signal, plus the time the tone is received by the switch, plus the time the tone is routed to the cross connect, and plus the time the tone is received by the gateway is minimal. This delay is easily modeled based on existing circuit switched delay values, and known typically to be in the range of 10 ms.

Once the VoIP signals are received at the workstation, the packets are converted to audio via the speaker 220. Thus, the 100 ms tone should be heard at the speaker 220. The speaker in this case also has a plug adapter (not shown as a separate entity) which provides the analog signal to the oscilloscope. Thus, the oscilloscope receives a signal on channel A 230 when the tone signal was essentially received on the facilities 206 by the central office, and the oscilloscope receives a signal on channel B 232 when the tone was audibly rendered by the speaker 220.

In this embodiment, the speaker is positioned so that the tonal sounds are directed into the microphone 222. This can be accomplished simply by positioning the speaker and the microphone together. The microphone can be manually positioned in any sort of manner, including taping the two together or constructing an audio channel. The sounds received by the microphone, which again should be a 100 ms tone (or whatever duration the original tone was), are then sent on a reverse path from the workstation, 218, to the hub/router 214, to the digital cross connect 210, to the central office 208, back to the telephone 200, where the tone is generated by the speaker 204. The oscilloscope will receive on its Channel A input, a signal 230 from the plug adapter 201, corresponding to the return signal. This is detected by the oscilloscope and reflects the return path.

The measurements of the oscilloscope can be analyzed to determine the overall delay in the various elements. This is shown in FIG. 4, which depicts some typical overall time delays associated with the embodiment shown in FIG. 3.

Figure 4:
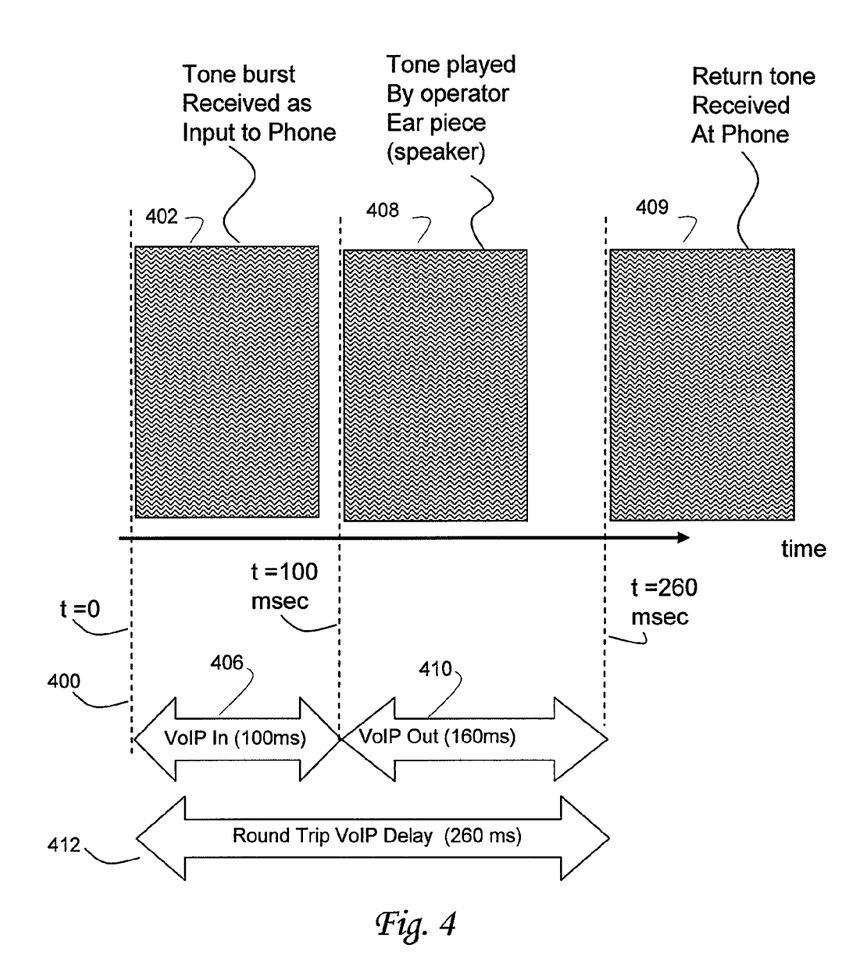
FIG. 4 illustrates one embodiment for various time delays measured.

In FIG. 4 (which is not drawn to scale), the vertical line 400 represents the starting point in time, or t=0. At this point, the tone 402 is generated and lasts 100 ms. Although 100 ms is used as a duration, other durations can be used, provided they are of a characteristic to be accurately measured (e.g., they cannot be so short that measurement is impractical). The oscilloscope knows when the signal was started (either by self triggering or via the synchronization with the tone generator), and the oscilloscope also knows when the signal 408 was received at the workstation. This duration 406 reflects the time from the time the tone was generated, converted to VoIP and played out at the workstation ("VoIP In" 406). In this embodiment, the entire delay is around 100 ms. However, the exact delay will vary based on the embodiment, equipment and various other factors.

Because the audio signal is immediately detected and 'looped around' at the workstation and returned to the telephone 200, this delay (return path or "VoIP Out") can also be easily measured. In practice, the return path 410 is about 160 ms. While it may appear intuitive that VoIP In and VoIP Out times should be the same, in practice, that is not the case. This is largely because the processing involved in the workstation in converting an analog signal into a voice packet is not the same as converting a voice packet to audio. Additional processing is required in converting analog signals to VoIP compared to the reverse process. Consequently, for a workstation, which has not been optimized for VoIP processing relative to other types of equipment, the delays are not the same.

FIG. 4 provides an overview of the end-to-end, and roundtrip delay 412 associated with the transmission of the tone signal. Because certain other times are well known, or can be disregarded, the delays associated with other equipment along the path can be estimated. This is shown in FIG. 5.

Figure 5:
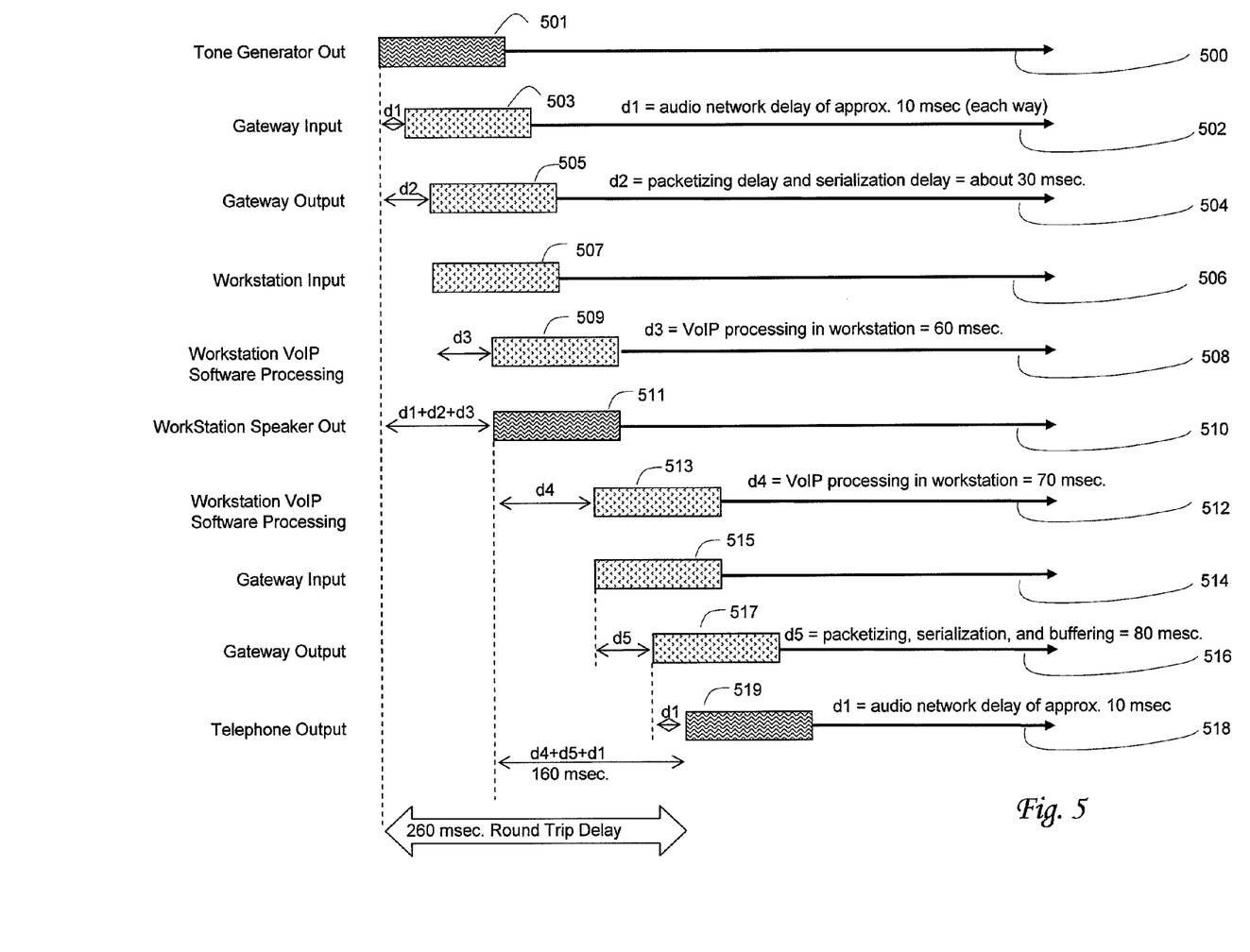
FIG. 5 illustrates one embodiment of various occurrences of speech delay in a telecommunications environment.

In FIG. 5, the first line 500 depicts the tone 501 being generated. Tone 501 is the "start time" and corresponds to when the tone generator begins the 100 ms tone. In FIG. 5, the box 501 is intended to be 100 ms long, and the curvy lines in the box 501 depict an analog signal. (Note that FIG. 5 is not drawn to scale.) As noted, the oscilloscope knows that time that the signal was generated since it was synchronized with the start of the signal.

The oscilloscope also receives the measurement of signal at the plug adapter. In practice, the delay is minimal and can be estimated as zero (hence it is now shown as a separate time chart). Thus, the delay between the tone being generated and the signal received by the central office (e.g., detected as an input signal to Channel A) is assumed to be zero. Thus, for practical purposes, the detection of the signal at the plug adapter is the 'start' time from which delay is measured.

The delay 502 from an input of a signal at a central office to the output of that signal is well known. Further, the additional delay of a digital cross connect is essentially the same time as the transmission delay. Given that the transmission speeds are at extremely high speeds (e.g., OC-48), the total delay d1 for the tone signal 503 to pass from the telephone 200 to the gateway is about 10 ms.

Once the signal is received at the gateway in digital form, it must be packetized. The gateway in this case is a device designed and optimized for such conversion, and its delay time is estimated based on manufacturer specifications. Consequently, the tone 503 is represented using discrete icons in the box, representing digitized voice. A typical delay time associated with a gateway based on the manufacturer's specifications is about 30 ms. This is shown in timeline 504 with a delay d2.

Next, in timeline 506, the signal must go from the gateway 213 through the hub/router 214 over the facilities 216 to the workstation. Because the hub/router 214 and facilities 216 also operate at very high speed, the delay in timeline 507 relative to the earlier timeline 506 is negligible. Thus, there is essentially no delay shown for the tone signal 505 from the gateway to the input of the workstation 507.

Next, timeline 508 depicts the delay encountered in processing the tone signal 509 in the workstation. In this case, the workstation must render the VoIP voice, which involves buffering and processing. Because the workstations are neither built nor maximized for VoIP processing, and are often primarily engineered for other functions, the processing time in the workstation is not readily known, nor consistent. This is illustrated as d3 in timeline 508. Further, the processing time may be dependent on the software and current processing tasks being performed by the workstation. However, the time to complete this task is essentially the same time that the oscilloscope detects the signal at the speaker. Thus, because there is virtually no delay associated with detecting the tone at the speaker of the workstation 511, the timeline for detecting tone at the speaker 510 is essentially the same as the workstation completing its VoIP processing.

The total delay with detecting the tone at the workstation that is shown in time line 510 is shown as about 100 ms, which includes a 10 ms delay in the central office, and a 30 ms delay in the gateway. This means the delay d3 associated with the workstation is approximately (100 ms−10 ms−30 ms=60 ms). The tone in 511 is illustrated as waves, since this represents the generation of the analog tone in the operator headset.

In the reverse direction, it is assumed that the workstation microphone receives the signal 511 without any delay compared to the time the output was detected. Consequently, the timeline 512 reflects the processing of the analog signal in the workstation necessary to form VoIP packets, which is shown as d4. At this moment, d4 is not known until the overall return time is measured. The voice packets must be sent from the workstation, to the hub/router, to the gateway, to the central office, and to the telephone, where it is detected by the oscilloscope.

Between timeline 512 and 514, the delay associated with the signal 513 and 515 is shown as essentially zero. This reflects that the delay attributed to the transmission facility 216 is essentially zero.

The delay associated in the gateway is shown as the difference in the time the signal is processed 515 in timeline 514 when entering the gateway from when the signal 517 exits the gateway in timeline 516 and shown by d5. This delay, d5, is derived from the equipment specification, and because of various factors, is estimated at about 80 ms, which is longer than in the reverse direction. Again, the time delays in the gateway are not symmetrical, and depend on which type of processing is invoked.

Finally, the delay from when the gateway 213 transmits the digital signals to the central office, to the telephone is represented by d1. This value is again about 10 ms. Thus, because the total return path is 160 ms, and the gateway consumes 80 ms, and an additional 10 ms consumed in the central office, the remaining delay of (160 ms−80 ms−10 ms=70 ms) can be calculated. Thus, workstation delay, d4, is about 70 ms.

In summary, the delay elements in FIG. 2 largely correspond to delay in the central office, delay in the gateway, and delay in the workstation. For speech transmitted from a caller to a workstation, the delays are 10 ms in the central office, 30 ms in the gateway, and 60 ms in the workstation. However, in the return direction, the delay is 70 ms in the workstation, 80 seconds in the gateway, and again 10 ms in the central office.

Once the respective delays are known, then the problem of addressing customer complaints, or adjusting performance parameters is facilitated by knowing where and when certain elements incur delay. For example, it appears that that there is additional delay in the return path, relative to the forward path, so that attempts to minimize delay should first focus on reducing delay on the return path. Further, because it is known which elements contribute to the largest portion of the delay, attention can be focused on replacing, engineering, or otherwise focusing on the likely culprits causing the delay.

The above represents an inexpensive and readily available solution to the problem of ascertaining delays in communications networks involving VoIP. This system and method avoids the requirement of specialized equipment, which also may be more complex to use. In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

That which is claimed:

1. A method comprising:
   instructing, by a first device, a tone generator to generate a first tone,
   the first tone being received by a telephone,
   the telephone generating a first signal that is based on the first tone;
   receiving, by the first device, information relating to the first signal,
   the first signal being transmitted to a second device, different than the first device, for processing to obtain data associated with the first signal,
   the data associated with the first signal being processed by a third device, different than the first device and the second device, to obtain a second signal;
   receiving, by the first device, information relating to the second signal;
   using the first device to measure a difference in time between receiving the information relating to the first signal and receiving the information relating to the second signal,
   using the first device to measure the difference including
   using the first device to determine a delay of the third device processing the data associated with the first signal to obtain the second signal, based on:
   information relating to the second device processing the first signal to obtain the data associated with the first signal,
   the information relating to the first signal, and
   the information relating to the second signal.

2. The method of claim 1 where the first device includes an oscilloscope, and
   where the oscilloscope and the tone generator are connected to synchronize the oscilloscope with a beginning of the generation of the first tone.

3. The method of claim 2 further comprising:
   receiving a synchronization signal from the tone generator to synchronize the oscilloscope with the beginning of the generation of the first tone.

4. The method of claim 1 where the first device includes an oscilloscope,
   where the telephone is connected to a plug adapter unit,
   where the plug adapter unit is connected to a telephone switch associated with the telephone,
   where a first input of the oscilloscope is connected to the plug adapter unit, and
   where receiving the information relating to the first signal includes receiving the information relating to the first signal at the first input via the plug adapter unit.

5. The method of claim 1 where a telephone call is established from the telephone to the third device using a telephone number, and
   where the first tone is generated after the telephone call is established.

6. The method of claim 5 where the telephone number is associated with an operator service.

7. The method of claim 6 where the operator service is a directory assistance service.

8. The method of claim 1 where the second tone is received by a microphone operatively connected to the third device.

9. The method of claim 8 further comprising:
   receiving information relating to a third signal associated with the second tone received by the microphone,
   where the information relating to the third signal is received from a plug adapter connected to the third device, and
   where the second tone is converted into packets conveying speech signals that are conveyed to the telephone; and
   using the first device to measure another difference in time between receiving the information relating to the first signal and receiving the information relating to the third signal.

10. The method of claim 9 where the data associated with the first signal includes packetized voice data,
    where at least one of the other difference in time, between receiving the information relating to the first signal and receiving the information relating to the third signal, or the difference in time, between receiving the information relating to the first signal and receiving the information relating to the second signal, is used to adjust a parameter, associated with the third device processing the packetized voice data, to reduce the delay.

11. A system comprising:
    a first device to:
    receive, from a telephone, information associated with a first signal corresponding to a first tone that is generated by a telephone over an established telephone connection,
    digitized data, representing the first signal, being generated, and
    the digitized data being processed by a second device, different than the first device, to generate packets, that convey the digitized data;
    receive, from a third device, information associated with a second signal that is based on the third device processing the packets,
    the third device being different than the first device and the second device; and
    provide an indication of a time between when the information associated with the first signal is received and when the information associated with the second signal is received,
    when providing the indication, the first device is to provide an indication of a delay associated with the third device processing the packets, based on:
    information relating to the second device processing the digitized data to obtain the packets,
    the information associated with the first signal, and
    the information associated with the second signal.

12. The system of claim 11 further comprising:
    a hub to convey the packets from the second device to the third device,
    where the second device includes a gateway.

13. The system of claim 11 where the second device includes a gateway,
    the system further comprising:
    a first telephone switch, operatively connected to a second telephone switch and the gateway, that conveys digitized data from the first telephone switch to the gateway.

14. The system of claim 13 where the second telephone switch is to provide an operator service on the established telephone call.

15. The system of claim 11 where the second tone is generated by a speaker of the second device, and
    where a microphone, connected to the third device, is to receive the second tone generated by the speaker.

16. A method comprising:
    receiving, at a first input of a first device, information relating to a first signal,
    the first signal being generated by a telephone based on a first tone, and the first tone being generated after a telephone connection, from the telephone to a second device, different than the first device, is established, digitized signals, associated with the first tone, being processed by a third device to generate packets conveying the digitized signals, the third device being different than the first device and the second device, and the second device processing the packets to cause a second signal to be generated;

receiving information relating to the second signal at a second input of the first device; and determining a delay associated with the second device processing the packets to cause the second signal to be generated, based on:
information relating to the third device processing the digitized signals to generate the packets,
the information relating to the first signal, and
the information relating to the second signal.

17. The method of claim 16 where a second tone, generated by the second device based on the second signal, is received at a microphone operatively connected to the second device,
where the third device includes a gateway,
where second packets, generated by the second device, are transmitted to the gateway, the second packets conveying a representation of the second tone,
where the gateway processes the second packets to generate second digitized signals that are transmitted to a telephone switch associated with the telephone,
where the telephone switch generates a third signal that is provided to the telephone, the third signal representing the second tone, and
where the method further comprises receiving the third signal at the first input of the first device.

18. The method of claim 16 further comprising:
determining a first time delay from when the first signal is generated to when the second signal is generated.

19. The method of claim 18 further comprising:
determining a second time delay from when the second signal is generated to when a third signal is generated,
where at least one of the first time delay or the second time delay is used to adjust a parameter, associated with the second device processing the packets, to reduce the delay associated with the second device processing the packets.

20. The method of claim 16 where the third device includes a gateway, and
where determining the delay associated with the second device processing the packets is further based on:
an estimated delay time associated with the gateway processing the digitized signals.

* * * * *